United States Patent
Chircop et al.

(10) Patent No.: US 11,372,596 B2
(45) Date of Patent: *Jun. 28, 2022

(54) SYSTEM AND METHOD FOR STORING DATA BLOCKS IN A VOLUME OF DATA

(71) Applicant: StorageOS Limited, Bicester (GB)

(72) Inventors: Alex Chircop, Milton Keynes (GB); André Lucas, Newbury (GB)

(73) Assignee: StorageOS Limited, Bicester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,618

(22) Filed: Jun. 27, 2019

(65) Prior Publication Data
US 2019/0339912 A1 Nov. 7, 2019

Related U.S. Application Data

(63) Continuation of application No. 15/814,003, filed on Nov. 15, 2017, now Pat. No. 10,353,632.

(60) Provisional application No. 62/422,357, filed on Nov. 15, 2016.

(51) Int. Cl.
*G06F 3/06* (2006.01)

(52) U.S. Cl.
CPC .......... *G06F 3/0661* (2013.01); *G06F 3/0604* (2013.01); *G06F 3/064* (2013.01); *G06F 3/0631* (2013.01); *G06F 3/0644* (2013.01); *G06F 3/0673* (2013.01)

(58) Field of Classification Search
CPC .... G06F 3/0661; G06F 3/0604; G06F 3/0673; G06F 3/064; G06F 3/0644; G06F 3/0631
See application file for complete search history.

(56) References Cited

U.S. PATENT DOCUMENTS

| | | | |
|---|---|---|---|
| 5,394,534 A | 2/1995 | Kulakowski et al. | |
| 6,360,300 B1 | 3/2002 | Corcoran et al. | |
| 6,657,562 B2 | 12/2003 | Radermacher et al. | |
| 8,878,705 B1 | 11/2014 | Dunayer | |
| 2007/0208893 A1 | 9/2007 | Azzarello et al. | |
| 2009/0190760 A1* | 7/2009 | Bojinov | G06F 3/0676 380/269 |
| 2009/0268903 A1* | 10/2009 | Bojinov | H04L 9/0894 380/45 |
| 2010/0250880 A1 | 9/2010 | Mimatsu | |
| 2013/0322501 A1* | 12/2013 | Takeuchi | H03M 13/6519 375/219 |
| 2014/0250322 A1 | 9/2014 | Fleischmann et al. | |

(Continued)

OTHER PUBLICATIONS

Microsoft Corporation; "Understanding Disk Terminology", Jun. 10, 2014; https://msdn.microsoft.com/en-us/library/dd163557(d=printer).aspx. Retrieved on Nov. 3, 2017; 2 pgs.

*Primary Examiner* — Mark A Giardino, Jr.
(74) *Attorney, Agent, or Firm* — Loza & Loza, LLP

(57) ABSTRACT

A method for storing data blocks within a volume of data is disclosed. The method involves creating a frame header to identify encoding and a size of a data block, storing the frame header and the data block in the volume of data, and creating an identifying sequence to identify if a data block is encoded or unencoded and storing the data block with the identifying sequence and with a frame header if the data block is encoded and storing the data block without the identifying sequence and without a frame header if the data block is unencoded.

17 Claims, 7 Drawing Sheets

(56) References Cited

U.S. PATENT DOCUMENTS

| | | | |
|---|---|---|---|
| 2016/0004449 A1 | 1/2016 | Lakshman et al. |
| 2016/0004450 A1 | 1/2016 | Lakshman et al. |
| 2016/0004451 A1 | 1/2016 | Lakshman et al. |
| 2016/0004466 A1 | 1/2016 | Lakshman |
| 2016/0004480 A1 | 1/2016 | Lakshman |
| 2016/0004481 A1 | 1/2016 | Lakshman |
| 2016/0004603 A1 | 1/2016 | Lakshman |
| 2016/0004611 A1 | 1/2016 | Lakshman et al. |
| 2016/0050297 A1 | 2/2016 | Koifman et al. |
| 2017/0031614 A1 | 2/2017 | Katiyar et al. |
| 2017/0068472 A1 | 3/2017 | Periyagaram et al. |
| 2017/0177448 A1 | 6/2017 | Muth et al. |
| 2017/0295239 A1 | 10/2017 | Fang |
| 2017/0300254 A1 | 10/2017 | Mutha et al. |

* cited by examiner

SYSTEM AND METHOD FOR STORING DATA BLOCKS IN A VOLUME OF DATA

CROSS-REFERENCE TO RELATED APPLICATION

This application is a continuation of U.S. patent application Ser. No. 15/814,003, filed on Nov. 15, 2017, which claims priority to provisional U.S. Patent Application Ser. No. 62/422,357, filed Nov. 15, 2016, entitled "Method and System for Efficient Storage of Encoded and Unencoded Data in a Storage System," which is incorporated by reference herein.

FIELD OF THE INVENTION

The invention relates generally to storage systems for storing digital data, and, more specifically to computer-based techniques for storing digital data in a volume of a storage system in encoded and unencoded formats.

BACKGROUND

In the field of computer systems, a computer application will persist data that needs to be stored for future retrieval in a data storage system. The data that needs to be stored will be organized into files and databases. Files and databases are grouped into logical representations known as volumes of data. Volumes of data can contain one or more files or databases. The smallest logical unit of storage is a data block, which typically embodies up to a few thousand bytes (e.g., 4k bytes) of data. A data block is the unit of data that is persisted to a storage system for future retrieval.

A storage system processes data blocks in groups known as volumes of data. A volume of data may also be referred to as a virtual disk, as when a storage system presents the volume of data to a computer application, the volume has the attributes and behavior of a disk device. A volume of data is a logical representation of a number of data blocks which are concatenated to form a larger set of data than can be stored as a group of data blocks. A storage system treats the volume of data as a single atomic unit. Data in a storage system may be stored unencoded such that the data block that is persisted is stored in unmodified form and can be retrieved without further decoding. Data is often stored by the storage system in an encoded form (e.g., compressed or encrypted) such that the data block which is to be persisted is first encoded prior to persisting, and is later unencoded (e.g., decompressed or decrypted) following future retrieval.

Data may be encoded for a plurality of benefits including but not limited to: including additional data to a data block to verify the validity of the data block; applying data reduction methods and algorithms to reduce the size of the data block (e.g., compression); and applying data cryptographic methods and algorithms to scramble the data block for security purposes (e.g., encryption).

Storage systems apply encoding on a group of data blocks, typically on a per volume basis. The storage system will then persist the definition of which encoding method or algorithm was utilized per volume so as to be aware of which method or algorithm to utilize when decoding data blocks from the same volume upon future retrieval. Applying encoding on a per volume bases has several limitations as different encoding types can only be applied to large groups of data. In addition, the user of the storage system typically has to choose which encoding type (e.g., data reduction algorithm or cryptographic algorithm) needs to be applied upon initial definition of the volume. This definition cannot be changed or amended after first application once data blocks have been persisted to the volume without retrospectively unencoding each data block in a volume and then re-encoding the data blocks to the new encoding definition.

Further, it may be desirable for different encoding to be variably applied to each individual data block instead of a whole volume of data blocks, based on a plurality of variable conditions including but not limited to: the content of the data; the ability of a data encoding algorithm to process a given data block; variable requirements from a computer application; and changing conditions within the storage system environment.

Thus, conventional storage systems that persist volumes of encoded data are limited in flexibility as it is typically not possible to apply different encoding mechanisms to different portions, or individual blocks of data, within the same volume of data.

SUMMARY OF THE INVENTION

A method for storing data blocks within a volume of data is disclosed. The method involves creating a frame header to identify encoding and a size of a data block, storing the frame header and the data block in the volume of data, and creating an identifying sequence to identify if a data block is encoded or unencoded and storing the data block with the identifying sequence and with a frame header if the data block is encoded and storing the data block without the identifying sequence and without a frame header if the data block is unencoded.

In an embodiment, the method involves storing blocks of unencoded data and blocks of encoded data together within a single volume of data.

In an embodiment, the method involves persisting unencoded data without adding additional encoding or framing overhead to a volume of data.

In an embodiment, the method involves applying different encoding types to different data blocks within a single volume of data.

In an embodiment, the method involves applying encoding to data blocks, that are stored in the volume but that were not previously encoded within the volume, while the storage system continues to access the volume of data.

In an embodiment, the method involves removing encoding from data blocks, that are stored in the volume and that were previously encoded, while the storage system continues to access the volume of data.

In an embodiment, the method involves generating an identifying sequence using at least one variable such that the identifying sequence is variable from one block of data to another.

In an embodiment, the identifying sequence is generated using at least one of content of the data block, a data block or volume identifier, extracts of the structure of the frame header in the data block, output of various merge functions, and a storage system supplied input vector.

Another method for storing a data block in a volume of data in a persistent data storage system is disclosed. The method involves determining if a data block is to be encoded before the data block is stored in a volume in a persistent data storage system, generating an identifying sequence related to the data block, if the data block is to be encoded before the data block is stored in the volume of data in the persistent data storage system, storing the data block in the volume of data in the persistent data storage system with the identifying sequence and a frame header, the frame header including an indicator of the size of the data block and an indicator of the type of encoding, and if the data block is not to be encoded before the data block is stored in the volume of data in the persistent data storage system determining if there is a match between the identifying sequence and the data block, storing the data block in the volume of data in the persistent data storage system without a header if there is not a match between the identifying sequence and the data block, and storing the data block in the volume of data in the persistent data storage system with the identifying sequence and a frame header if there is a match between the identifying sequence and the data block, the frame header including an indicator of the size of the data block and an indicator of the type of encoding.

In an embodiment, the identifying sequence is generated by including data from the data block as a variable in the generation of the identifying sequence such the identifying sequence would vary based on the content of the data block.

In an embodiment, the identifying sequence is generated by including an input vector supplied by the storage systems such that the identifying sequence is utilized to recognize the storage system instance or the storage system version that encoded the data block.

In an embodiment, the method involves reading the data block from the volume of data in the persistent data storage system and reading the data block involves reading the data block from the volume of data in the persistent data storage system, and generating an identifying sequence from the block of data that is read from the volume of data in the persistent data storage system, where the identifying sequence is generated using the same technique that was used to persist the block of data. The method further involves determining if there is a match between the identifying sequence and the data block, using the data block as the data block was read from the volume of data if there is no match between the identifying sequence and the data block, and determining if the data block is encoded from a header if there is a match between the identifying sequence and the data block.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements. Additionally, in some cases, reference numbers are not repeated in each figure in order to preserve the clarity and avoid cluttering of the figures.

DETAILED DESCRIPTION

Figure 1:
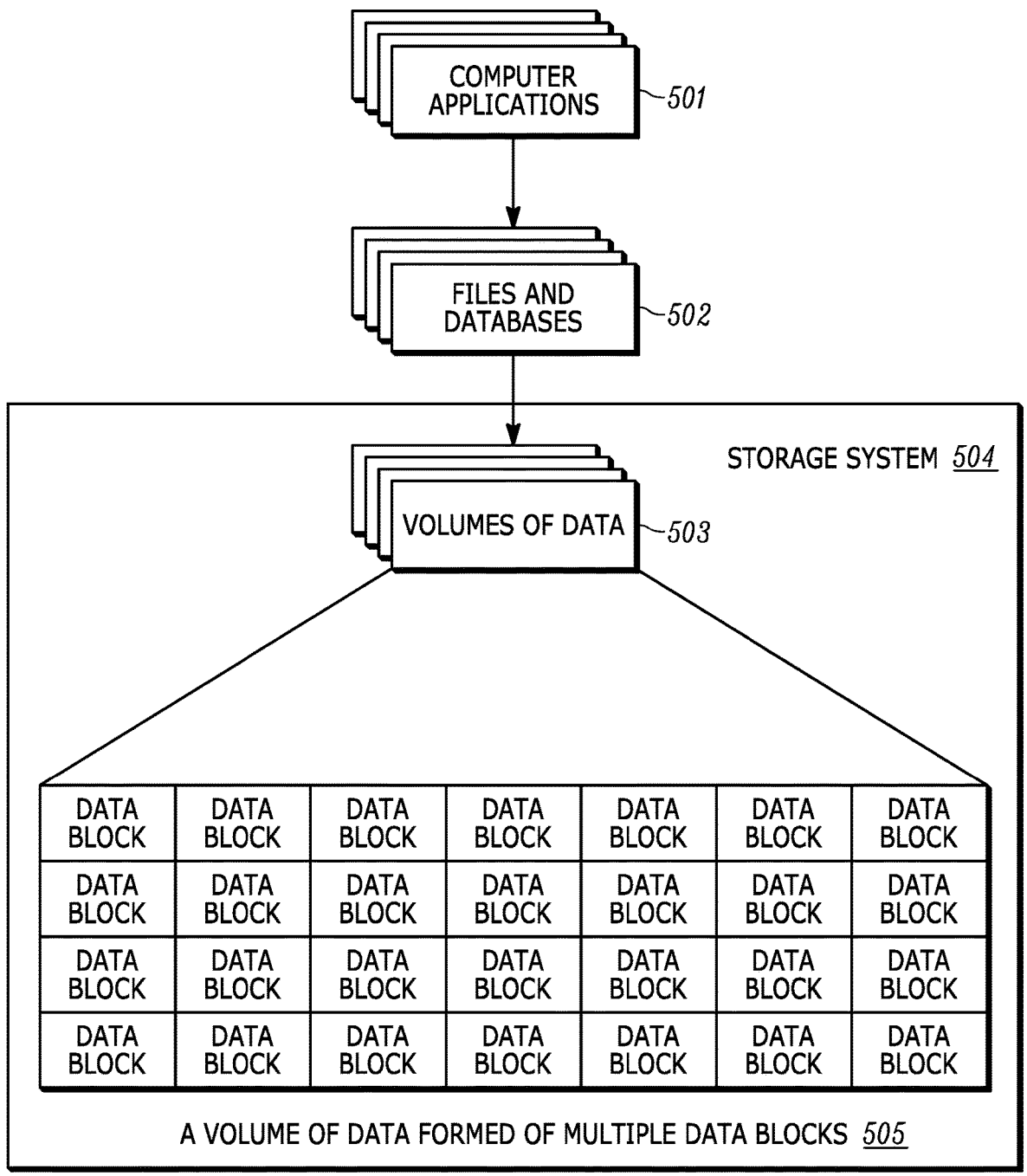
FIG. 1 illustrates the logical organization of storage data units including a computer application usage of one or more files and databases which are persisted in one or more volumes of data which are comprised of a number of data blocks.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

The present disclosure describes systems and methods for providing efficient storage of encoded and unencoded data blocks within a volume of data that may be implemented by a storage system.

In an embodiment, a storage system will treat a volume of data as a single atomic unit, which has a set of attributes that may control the application of encoding of the data blocks in the volume. A storage system is typically not able to mix unencoded and encoded data within a single volume of data without having to maintain complex indexes of the data blocks, which would generate significant data capacity overhead as well as impact performance due to the maintenance of the indexes.

Advantageously, in one embodiment, a method to support the mixture of unencoded and encoded data within a single volume of data is disclosed such that a volume of data no longer has to be entirely encoded or unencoded.

In an embodiment, a method involves a storage system that reduces the overhead for storing unencoded blocks in a volume of data to close to zero or less than, for example, 0.00005% of the total size of the volume of data by using an identifying sequence that allows the storage system to distinguish encoded blocks of data from unencoded blocks of data. The use of an identifying sequence prevents the requirement to store a frame header for every block of data such that a frame header may be omitted from a block of data when storing an unencoded block, thus avoiding a large overhead.

In a further embodiment, the disclosed techniques provide for a method for a storage system to process multiple types of encoding within a single volume of data such that a volume of data can store data blocks that are encoded with different encoding methods and/or algorithms.

Further, in one embodiment, a method of creating identifying sequences is disclosed to further improve storage efficiency. In one case, testing of the method of generating an identifying sequence demonstrated a statistical advantage of reducing encoding overhead of between 10 times and 20,000 times based on the type of computer applications, files, and databases that were involved.

The encoding techniques described herein may provide multiple advantages for a storage system.

In some embodiments, advantages related to a volume of data that includes data reduction methods or algorithms (commonly known as compression) include:

Where data being stored in a volume of a storage system is compressible (e.g., able to be processed by a data reduction method and/or algorithm) and non-compressible data (e.g., where the data reduction method and/or algorithm is not able to further reduce a data block beyond the current size of the data block), the technique provides the ability to have a mix of compressible and non-compressible data blocks within a single volume of data without applying any framing or other encoding overhead for the non-compressible data.

Where a computer application has enabled a data reduction method (e.g., data compression) post volume creation, the technique provides the ability to have a mix of data blocks which have been reduced (e.g., compressed) and others that have not been reduced (e.g., not compressed) in a single volume of data.

Where a computer application has disabled a data reduction method post volume enablement, the ability to have a mix of data blocks which have been reduced and others that have not been reduced in a single volume of data.

In some embodiments, advantages related to volumes of data that include cryptographic methods and/or algorithms (commonly known as encryption) include:

Where an existing unencrypted volume of data is requested to be encrypted, the blocks of data in the volume can be encrypted in situ allowing a storage system to apply the interim cryptographic method while the volume of data is still being utilized, as the volume of data can contain both the unencrypted blocks and the encrypted blocks simultaneously. This can be achieved as the storage system can safely identify which data blocks have already been encrypted and which data blocks have yet to be encrypted such that data blocks can continue to be persisted to and retrieved from the same volume whilst the cryptographic method is being applied to other blocks in the volume.

Where an existing encrypted volume of data is requested to be unencrypted, the blocks of data can be unencrypted in situ allowing a storage system to decode the interim cryptographic method while the volume of data is still being utilized, as the volume of data can contain both the unencrypted blocks and the encrypted blocks simultaneously. This can be achieved as the storage system can safely identify which data blocks have already been decrypted and which data blocks have yet to be encrypted such that data blocks can continue to be persisted to and retrieved from the same volume whilst the cryptographic method is being applied to other blocks in the volume.

Where an encryption key has been changed or revoked, the technique provides the ability to have a mix of data blocks having current encoding and data blocks having new encoding within the same volume of data.

As is described in detail below, storage systems are able to process multiple blocks of data that are encoded with different encoding methods within a single volume of data.

FIG. 1 illustrates an example of the logical organization of a data storage system 504 in a computer system 500 that includes computer applications 501 and files and databases 502. As shown in FIG. 1, a number of computer applications 501 will create, update, and delete a number of files and databases 502 as part of their normal operations. The files and databases are persisted in one or more volumes of data 503 within the storage system 504. The storage system 504 may include multiple different computer components and will process the volumes of data 503.

In an embodiment, the volumes of data 503 include multiple data blocks 505, which are grouped together and identified by the volume. The techniques described herein are not specific to any particular storage system 504 and specify methods and systems for encoding the individual blocks within a volume of data such that different blocks simultaneously stored within a single volume of data can be encoded using different methods, algorithms, systems, and/or processes but still identified correctly upon future retrieval by the storage system 504. This allows the storage system to continue to treat a volume of data 503 as a single atomic instance without having to maintain complex indexes of the encoding used by data blocks, which would generate significant data capacity overhead as well as impact performance due to the maintenance of the indexes. Additionally, the technique may involve efficiently storing unencoded information.

Figure 2A:
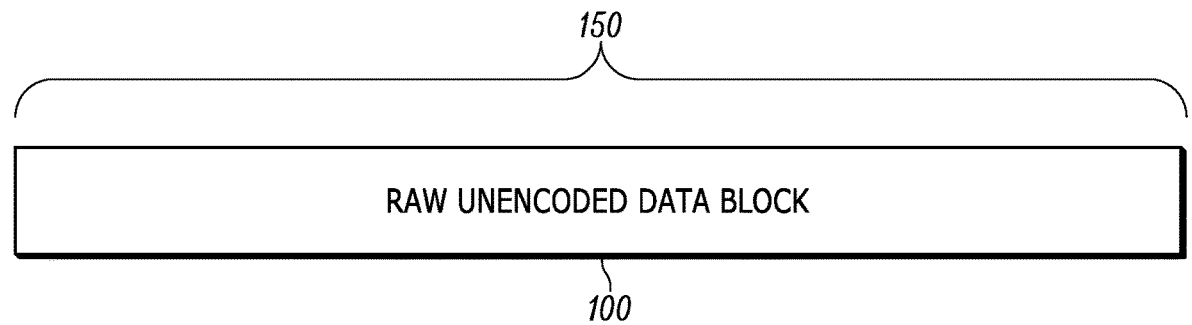
FIGS. 2A-2D illustrate different types of data blocks in various formats.
Figure 2B:
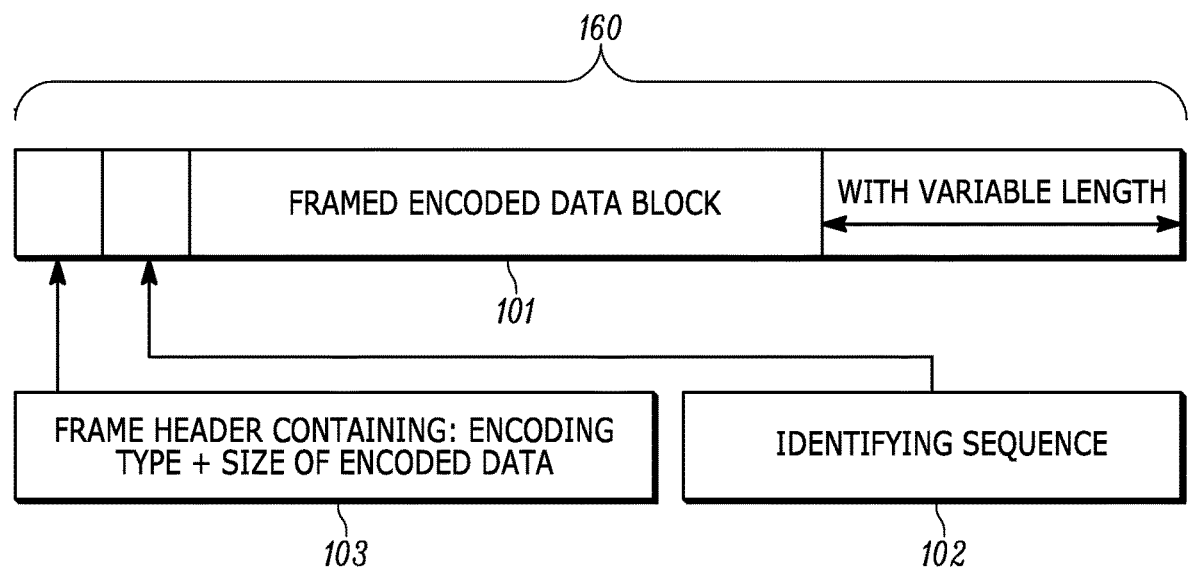
Figure 2C:
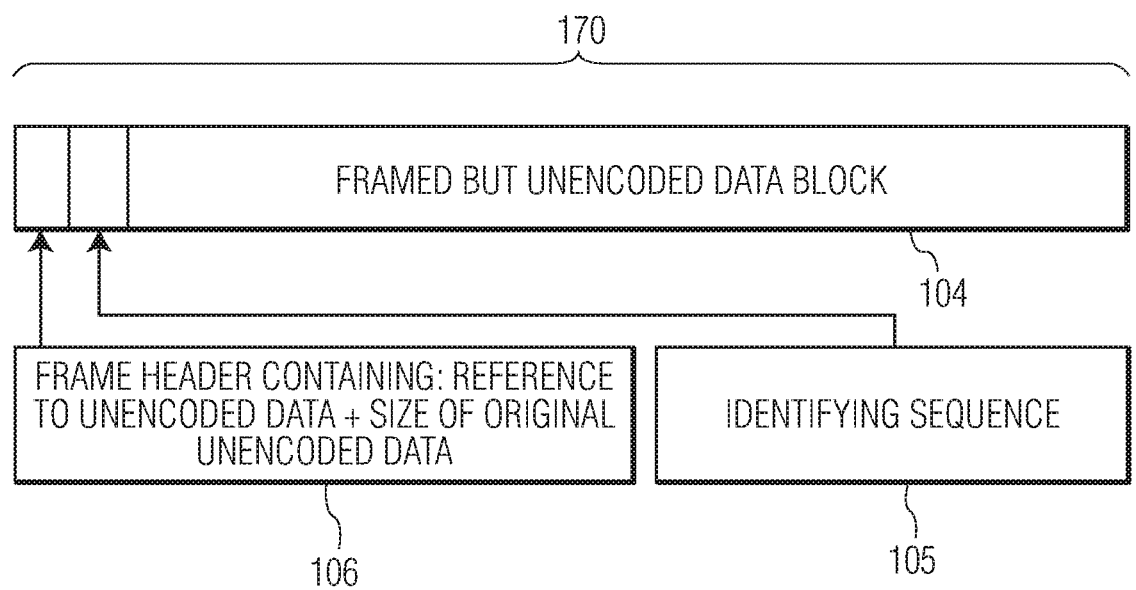
Figure 2D:
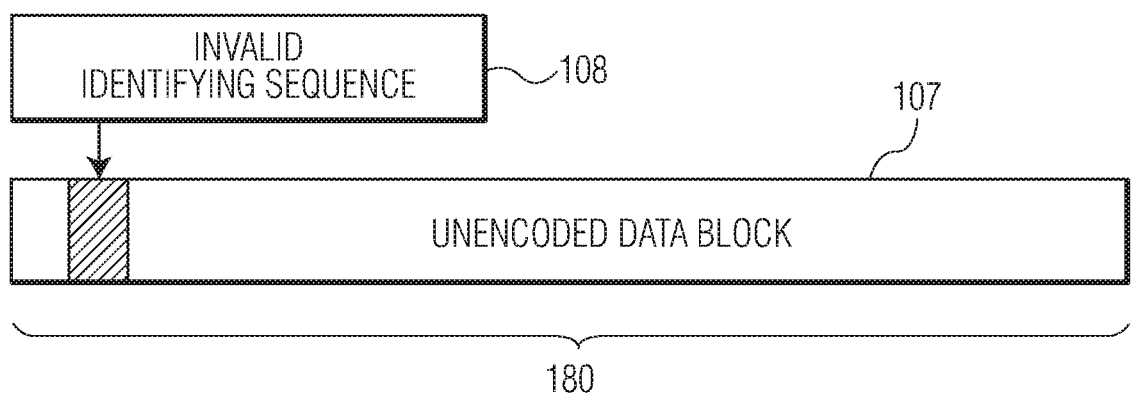

FIGS. 2A-2D illustrate logical representations of a data block in a number of different formats. FIG. 2A depicts a data block 150 that is made up of a raw unencoded data block 100. The data block of FIG. 2A may be referred to as an "unframed unencoded data block." FIG. 2B depicts a data block 160 that includes a frame header 103, which includes an encoding type and a size of the encoded data, an identifying sequence 102, and an encoded data block 101. The data block of FIG. 2B may be referred to as a "framed encoded data block" and may have a variable length depending on, for example, the encoding applied to the data. FIG. 2C depicts a data block 170 that includes a frame header 106, which includes a reference to unencoded data (e.g., an indication that the data is not further encoded) and a size of the original unencoded data, an identifying sequence 105, and an unencoded data block 104. The data block of FIG. 2C may be referred to as a "framed but unencoded data block." FIG. 2D depicts an unframed unencoded data block 180, similar to the unframed unencoded data block 150 of FIG. 2A, which illustrates a case in which the bits in the location of an identifying sequence do not match a generated identifying sequence. In the example of FIG. 2D, the bits in the location of an identifying sequence are identified by the dashed block 108 and labeled as an "invalid identifying sequence" and the unframed unencoded data block is made up of a raw unencoded data block 107. In an embodiment, a data block may be 4k bytes, the frame header may be 2-32 bytes, and the identifying sequence may be 2-32 bytes. Although examples of a block size, a frame header size, and an indentifying sequence size are provided, other sizes are possible.

With reference to FIG. 2A, the data block 150 as utilized within a file or database may be in an unencoded format, which is treated as a small unit of data storage. Within a volume of data 505, multiple data blocks will be stored and can be individually encoded based on the requirements defined within the storage system 504. In one embodiment, a frame header may be 2 bytes in size, where some of the bits are used to signify the encoding type (or to indicate that there is no encoding) and some of the bits are used to identify the data size. For example, a 2-byte frame header is added to the original data that is to be stored in a volume of data.

Persisting Data

Figure 3:
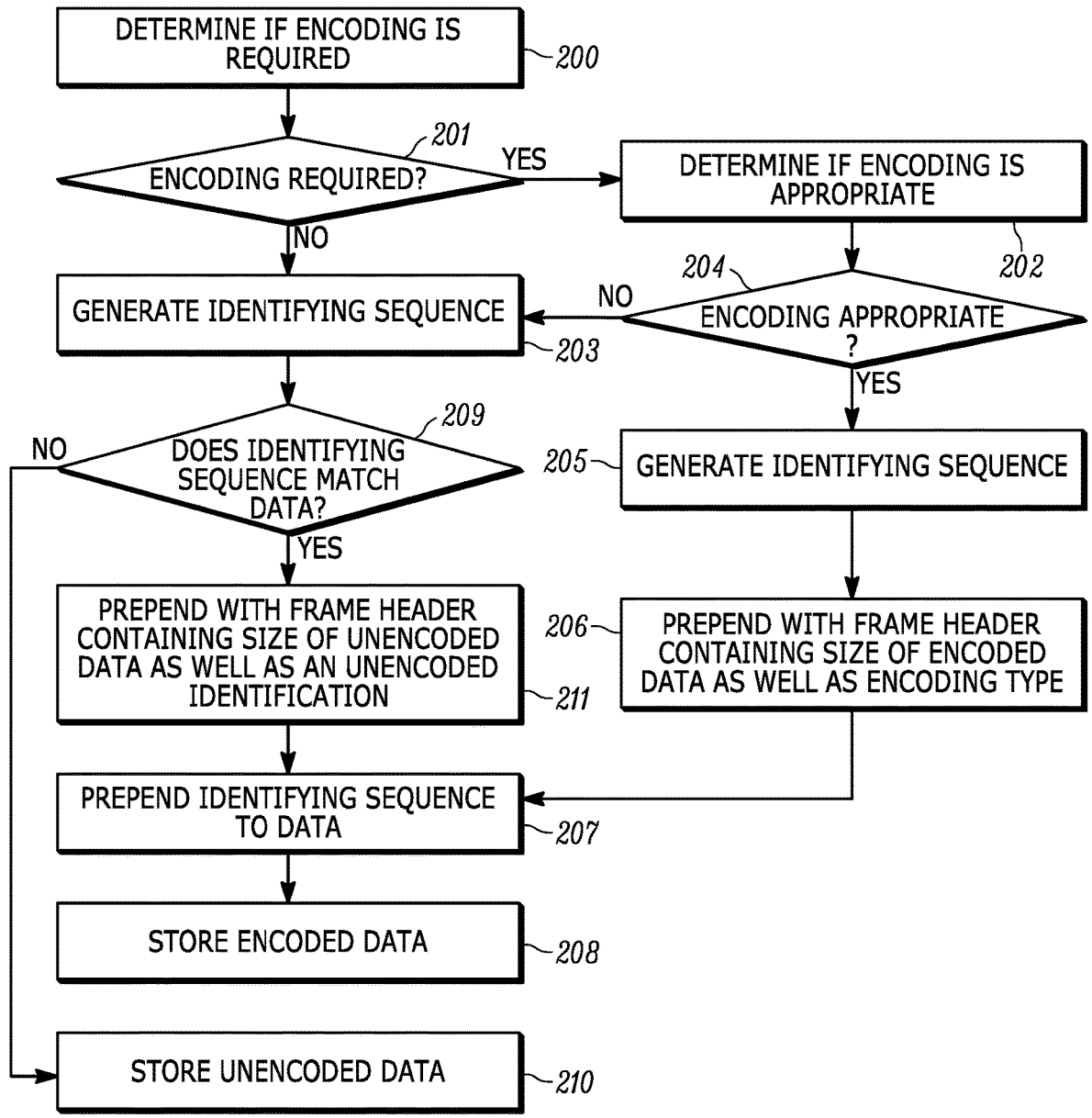
FIG. 3 illustrates an example of a technique to efficiently encode data blocks prior to data being persisted in a storage system in accordance with an embodiment of the invention.

FIG. 3 illustrates an example of a method that the storage system 504 can utilize to encode data blocks and to persist data blocks within the storage system for future retrieval. In an embodiment, when a data block is initially received by the storage system (e.g., as part of a file or database 502), the data block will be in an unencoded format, e.g., data block 150 as shown in FIG. 2A. The storage system 504 will initially determine if the data block should be encoded at block 200. The storage system can determine the requirement for encoding at block 200 based on, for example, multiple statically and dynamically updated factors including but not limited to: the computer application 501 that produces the data block; the definition of the storage system 504; and the configuration as specified by a user of the storage system 504.

If, at decision point 201, it has been determined that encoding is required, at block 202, the storage system will apply one or more encoding methods to the data block and then determine if the encoding is appropriate.

Volumes of data often contain a mixture of data types. As an example, a volume of data that contains computer files relating to a website will typically contain files with different content such as written text as well as images or video content. Compression encoding methods recognize patterns in the data and remove redundancies to reduce the size of the data, while including indexes to reconstruct the original data during decoding. Text and numbers such as used in text files and databases are highly compressible, but images and video content typically are not compressible as the image encoding process has already removed redundant patterns in the data. If data that is submitted to the storage system for compression is already compressed, perhaps because a computer application 501 or database may selectively compress some types of data, or if the data is uncompressible such as content from images or videos, then attempting to compress that data typically results in the data growing in size as the encoding process can not reduce the data patterns but still has to include all the indexes related to the compression process. This can sometimes lead to the data returned by the encoding process to be double the size of the original data. This could be for many different reasons including but not limited to: attempting to compress a data block which contains uncompressible data, perhaps because the data was already compressed; attempting to encode data that was previously encoded; and/or attempting to encode data that would result in the encoded data block being larger than the original unencoded data block.

Referring again to FIG. 3, if at decision point 204, it is determined that the encoding of the data block may not be appropriate (e.g., because compression of the data block would actually increase the size of the data block), then the process proceeds to block 203 and the data block in processed as an unencoded data block. If at decision point 204, it is determined that the encoding of the data block may be appropriate (e.g., because compression of the data block would decrease the size of the data block), then the process proceeds to block 205.

Assuming that a data block either did not require encoding ("no" path from decision point 201) or encoding was not appropriate ("no" path from decision point 204), then the process proceeds to block 203. At block 203, an identifying sequence is generated for a particular data block. In an embodiment, the identifying sequence would be generated at block 203 by the storage system. The identifying sequence, e.g., identifying sequence 102 (FIG. 2B) can be as simple as a static set of bytes or can be generated dynamically based on some combination of attributes of the data block and encoding. A method for dynamically generating the identifying sequence is illustrated in FIG. 5 and described below.

The identifying sequence can be used to identify if a data block has been encoded, and may be prepended to a data block such that the block can be recognized as encoded upon future retrieval. At decision point 209, the storage system 504 will determine if the generated identifying sequence for an unencoded data block is a match for existing data within the unencoded data block, see for example, the identifying sequence 108 in the data block 180 shown in FIG. 2D. The storage system will determine if there is a match by comparing the generated identifying sequence against the data in the unencoded data block in the position where a frame header would be located within the unencoded data block were it in actuality an encoded data block. If the generated identifying sequence is not a match to the data within the existing data block (referred to as an "invalid identifying sequence"), at block 210 the storage system will persist the unencoded data block unmodified and without adding any storage overhead such as a frame header or an identifying sequence. In this case, the original data block is stored in a volume of the storage system without any additional bits being added to the original data block.

If there is a clash such that the generated identifying sequence is matched by data in the existing data block (e.g., a match between the generated identifying sequence and the data in the position where such an identifying sequence would be located in a block such as the block shown in FIG. 2C), at block 211 the storage system will prepend the unencoded data block (e.g., block 100 of FIG. 2A) with a frame header 106 (FIG. 2C) identifying the size of the unencoded data and indicating that the data is unencoded and at block 207 will prepend an identifying sequence, e.g., identifying sequence 105 (FIG. 2C), to the unencoded data, resulting in a data block with a format as shown in FIG. 2C. At block 208, the data block 170 as shown in FIG. 2C is then persisted by the storage system.

Figure 5:
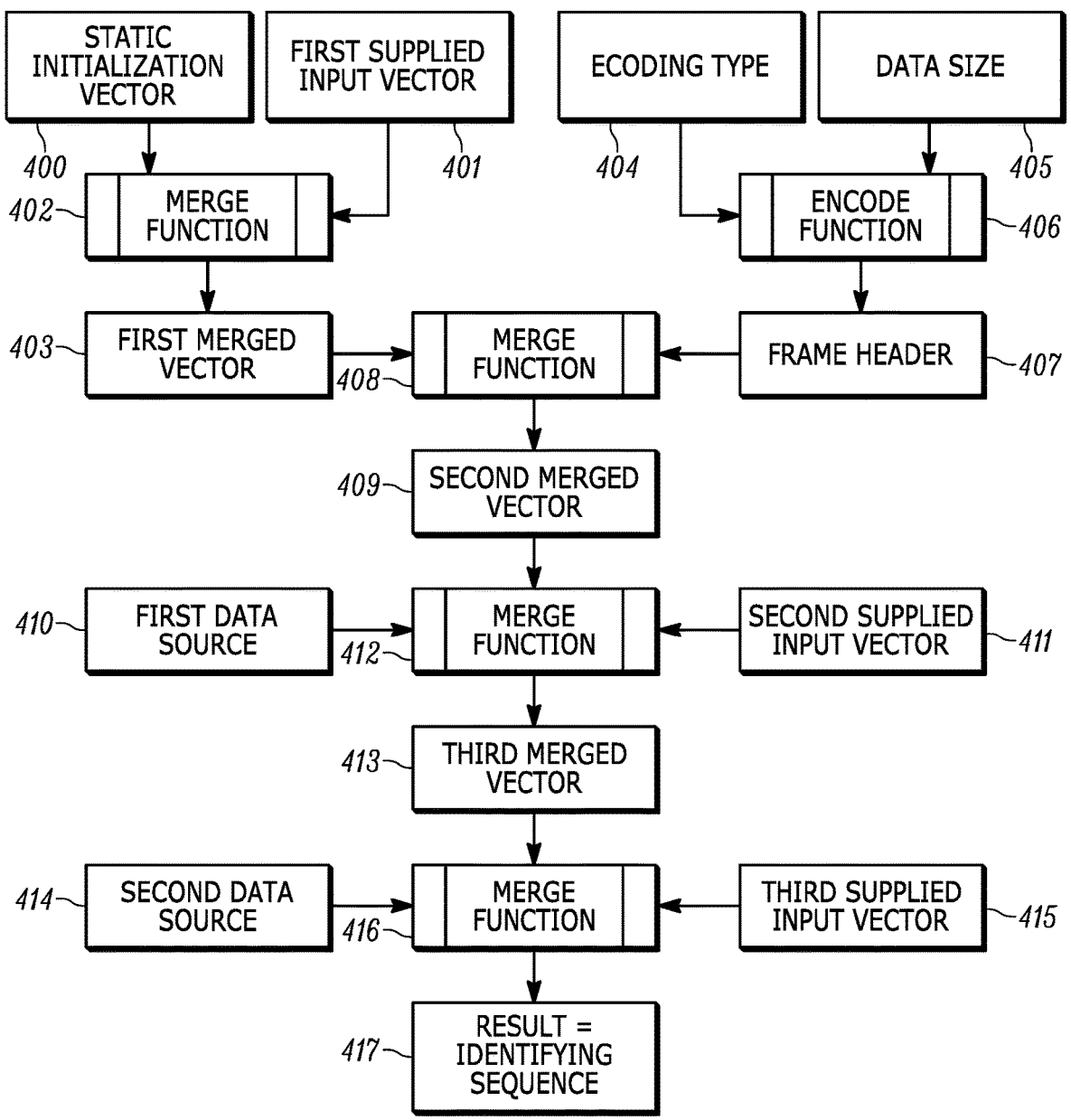
FIG. 5 is a flow diagram describing a method of generating an identifying sequence that can be used in the encoding of a data block in accordance with an embodiment of the invention.

If encoding is required at decision block 201 and it is determined to be appropriate at decision point 204, then the storage system will generate an identifying sequence for the encoded data block at block 205 (e.g., using at least a portion of the encoded data as described, for example, with reference to FIG. 5) and at block 206 will prepend a frame header 103 (FIG. 2B) containing the size of the newly encoded data block as well as the type of encoding that was utilized to encode the data. At block 207, the storage system will also prepend the identifying sequence 102 (FIG. 2B) for the encoded data block and at block 208 will persist the data block 160 in the format as shown in FIG. 2B.

It should be noted that a data block with the format shown in FIG. 2B may not be the same size as the original unencoded data block (e.g., the block shown in FIG. 2A) and may have a variably smaller or larger size depending on the encoding type utilized by the storage system. For example, if the unencoded data block 100 (FIG. 2A) is successfully compressed, the encoded data block 101 (FIG. 2B) will be smaller than the unencoded data block 100.

According to the process illustrated in FIG. 3, some data blocks are stored in a volume of data in the format shown in FIG. 2A while other data blocks are simultaneously stored in the same volume of data in the format shown in FIG. 2B and/or FIG. 2C.

Retrieving Data

Figure 4:
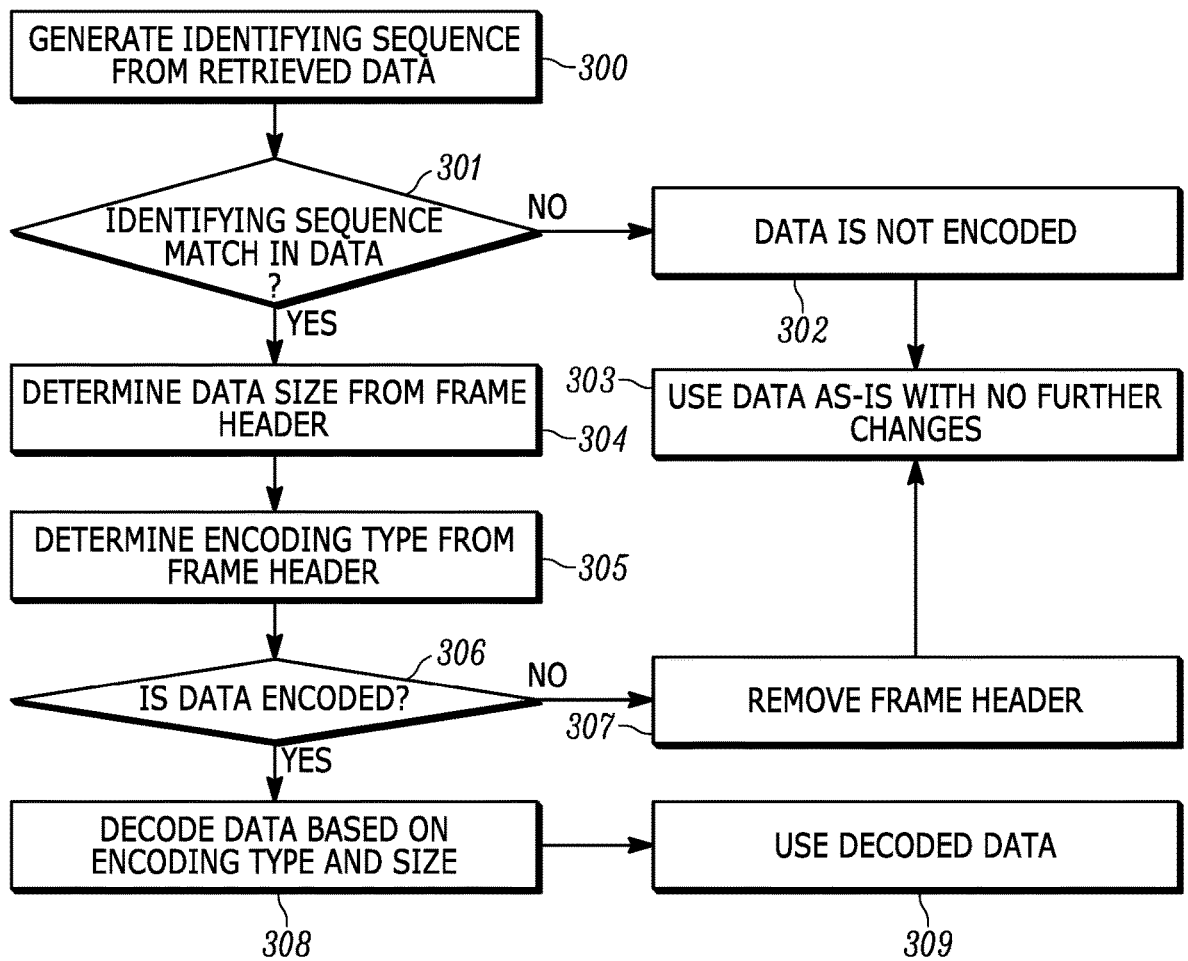
FIG. 4 illustrates an example of a technique to retrieve a data block that was previously persisted in a storage system in accordance with an embodiment of the invention.

FIG. 4 illustrates an example of a method that can utilized, e.g., by the storage system 504, to retrieve a data block from the storage system. For example, the method can be used for the case in which some data blocks are stored in a volume of data in the format shown in FIG. 2A while other data blocks are simultaneously stored in the same volume of data in the format shown in FIG. 2B and/or FIG. 2C.

The computer applications 501 will expect that the data within files and databases 502 will be in the previously unencoded format such as shown in FIG. 2A, e.g., in the original format as provided in the files and databases.

When the storage system retrieves a data block from a volume of data, the storage system needs to be able to determine if the data block has been encoded or not and to apply the appropriate decoding mechanism to be able to generate the original unencoded data block (e.g., as shown in FIG. 2A) that is expected by the corresponding computer application.

In an embodiment and with reference to FIG. 4, at block 300, the storage system will first generate an identifying sequence using an identical method to that used when persisting the data, e.g., at blocks 203 and 205 (FIG. 3). For example, the data block will be accessed and the same algorithm will be used to generate an identifying sequence, which will likely involve using elements of the data block as input to generate the identifying sequence. For example, an identifying sequence may be generated using the technique described below with reference to FIG. 5.

At decision point 301, the identifying sequence is compared to corresponding bits in the retrieved data block for a match. That is, the generated identifying sequence is compared to the same set of bits in the location where an identifying sequence would be if the block included an identifying sequence. If a match is not established, then the storage system can authoritatively determine that the data block has not been encoded at block 302 and therefore the data block is in an unencoded format such as shown in FIG. 2A. The storage system can then process the data block as-is at block 303 without making any changes to the data block.

If at decision point 301 the storage system determines that there is a matching identifying sequence in the data block, then at block 304 the size of the data block and at block 305 the encoding type (which may be an indication that data block is actually unencoded but framed) can be derived from the frame header based on, for example, the format of the data block as shown in FIG. 2B.

Once the size and the encoding type of the data block have been derived, the storage system may determine that the data block has been framed as shown in FIG. 2C (e.g., an unencoded data block 104 was prepended with a frame header 106 and an identifying sequence 105), at which point the storage system only has to remove the previously prepended header and identifying sequence at block 307 and is then able to use the data block at block 303 in the unencoded format.

If the encoding type or types 103 has been derived from the prepended frame header (e.g., it has been determined at decision point 306 from the frame header that the data has been encoded), then the storage system can apply the appropriate decoding method or methods at block 308 to the data block. Once the decoding has been applied, the storage system will be able to use the decoded data at block 309 in the previous unencoded format as shown in FIG. 2A.

In many storage systems that persist data, the data is persisted to non-volatile memory such as magnetic storage media or solid state storage media (e.g., a solid state drive (SSD)). The media persists data in units of a whole data block and retrieval is implemented in units of whole data blocks. Adding even a small header to an uncompressed data block will mean that the data block that is persisted will overflow into a second data block and retrieval of the persisted data block will require the retrieval of two data blocks from the media. This means that each retrieval will require twice the time and twice the compute resources to process. It is therefore desirable to ensure that every data block that is persisted by the storage system only consumes up to a single block on the media that it is persisted to. Thus, a 4k data block that is received from an application for storage and stored without adding any additional information (e.g., a header) is able to be stored in a single data block.

Generating the Identifying Sequence

The identifying sequence as defined within the data persisting and data retrieval methods behaves like a signature that can be recognized by the storage system to determine if a block is encoded or unencoded. The identifying sequence can be formed of, for example, one or more bytes of data which serve as the content that the storage system would recognize as a signature of an encoded block.

The identifying sequence can be static and can be a short sequence (e.g., 1 or 2 bytes) or a long sequence (e.g., 3 or more bytes). A static identifying sequence can cause inefficiency in the storage system as it is possible for the static data to frequently match unencoded data in the data block, thus requiring the prepending of a frame header as described with reference to the format shown in FIG. 2C. Prepending a frame header to unencoded data creates additional overhead to the storage requirements for individual data blocks. This issue would happen much more frequently if the computer application also used the identifying sequence in the structuring of the files and databases 502 that eventually were persisted by the storage system 504 into volumes of data 505. As an example, this issue is more likely to occur if the computer application or database also happened to utilize the string of data in the identifying sequence as a method of formatting or processing data.

FIG. 5 illustrates an example of a method of generating the identifying sequence that greatly reduces the chance that the generated identifying sequence will match a string of data in an unencoded data block. In this method, the identifying sequence is generated using a number of variables such that the identifying sequence is variable from one block of data to another. This statistically reduces the number of times that the generated identifying sequence matches the data in an unencoded block.

The improved method of generating the identifying sequence may utilize a plurality of variables which can include but are not limited to: content of the data block; data block or volume identifier; extracts of the structure of the frame header in the data block; static information; and output of various merge functions.

In an embodiment, it is desirable to use variables that are expected to change frequently within the blocks of data, such as the content of the data block itself. Using variables that are expected to change frequently will make it more likely that the identifying sequence changes for different types of data but is still recognizable by the system.

In an embodiment, in order to generate the identifying sequence, at block 402, a storage system would start with a fixed (e.g., static) initialization vector 400, which is merged with a storage system supplied input vector 401 to generate the first merged vector 403. In an embodiment, using a storage system supplied input vector provides a method to link the identifying sequence to the version of the storage system software that is generating the sequence. This allows a storage systems to generate identifying sequences that are unique to that storage system, whilst allowing another system to recognize the data block as belonging to that storage system. In an embodiment, the storage system supplied input vector is another variable used in the generation of the identifying sequence and, in one example, is a numeric value.

The merge function at block 402 can be any method where data is combined. Suitable methods may be binary operations such as XOR or mathematical operations such as addition.

The storage system supplied input vectors can be static unique values known to the storage system. Additionally, the input vectors can be generated based on statistical analysis of data sets.

The frame header of a block (e.g., frame headers 103 and 105) includes the encoding type 404 and data size 405 which at block 406 are encoded to create a frame header 407. For example, the merge function at block 406 can be any method where data is combined. Suitable methods may be binary operations such as XOR or mathematical operations such as addition.

At block 408, the first merged vector 403 is merged with the frame header 407 to generate a second merged vector 409. For example, the merge function at block 408 can be any method where data is combined. Suitable methods may be binary operations such as XOR or mathematical operations such as addition.

At block 412, a sequence of data 410 from within the data block is selected to be merged with the second merged vector 409 and a second storage system supplied input vector 411 to create a third merged vector 413. For example, the merge function at block 412 can be any method where data is combined. Suitable methods may be binary operations such as XOR or mathematical operations such as addition.

At block 416, a second sequence of data 414 from within the data block is selected to be merged with the third merged vector 413 and a third storage system supplied input vector 415 to create the final identifying sequence 417.

The above-described technique for creating an identifying sequence can statistically reduce the impact of a false positive match of the identifying sequence with the original block of data by ensuring that multiple sources of information are used in the computation of the identifying sequence, including excerpts of the actual data block. Using source data from the original data block in merge operations reduces the likelihood that a computed identifying sequence will also match the actual source of the computation.

Figure 6:
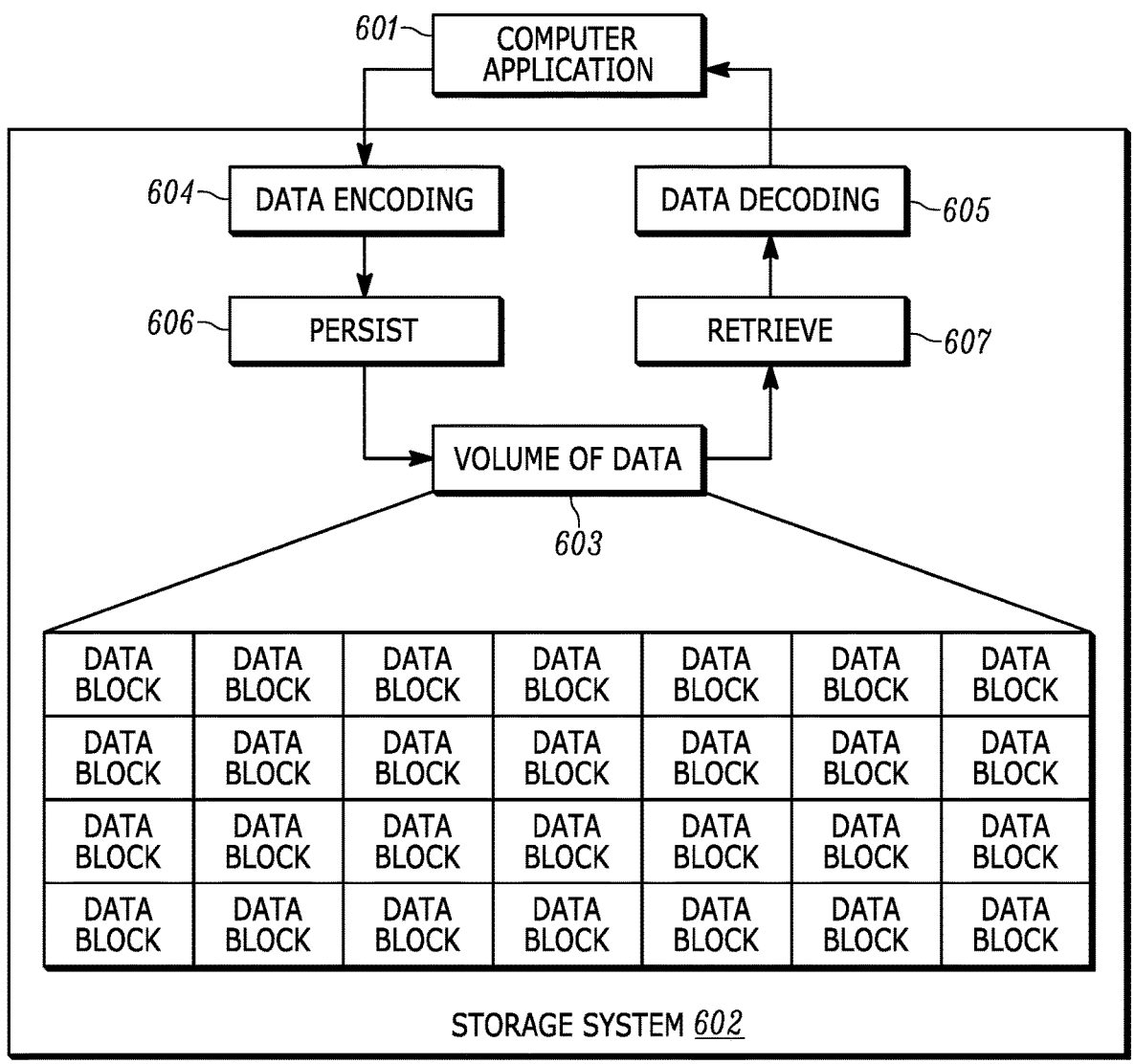
FIG. 6 illustrates an example of the implementation of encoding and decoding within a storage system.

FIG. 6 illustrates an example of an interaction between a computer application 601 and a storage system 602 that are processing a volume of data 603. The computer application and the storage system are the same as described with reference to FIG. 1. The storage system of FIG. 6 may implement data encoding at data encoding block 604 (e.g., compression and/or encryption) on receipt of data from the computer application 601 and then persist the data at persist block 606 into a data block within a volume of data 603. The storage system would also perform the reverse operation when the data is requested for retrieval at retrieve block 607 by the computer application 601 where the data would be retrieved from a data block in the volume of data 603 and decoded at data decoding block 605 prior to delivering the data to the computer application 601.

In an embodiment, the functionality described with reference to FIGS. 2-5 is implemented in the storage systems 504 and 602 as described with reference to FIGS. 1 and 6, respectively. In an embodiment, the functionality described with reference to FIGS. 3 and 5 is performed at least in part by the data encoding block 604 and the persist block 606. In an embodiment, the functionality described with reference to FIGS. 4 and 5 is performed at least in part by the retrieve block 607 and the data decoding block 605.

In an embodiment, the action of "persisting" data involves storing data such that the data will exist from session to session. Persistent data can be contrasted with transient data in which the data is lost from session to session. In an embodiment, persistent memory, which is used to "persist" data, involves data structures that are stored such that the data structures can continue to be accessed, by for example a computer application, using memory instructions or memory Application Programming Interfaces (APIs) even after the process that created (or last modified) the data has ended. In an embodiment, persisted data is stored on non-volatile memory such as a magnetic disk drive or a solid state drive (SSD). In an embodiment, persisted data is data that is stored such that the data exists outside of the application that created the data, such that the data can be recalled after the current instance of the application has been ended. In an embodiment, data is persisted when an application transfers the data to a storage system and provides mappings from the native programming language data structures of the application to date structures of the storage device.

As used herein, a computer application or application program may be a software program that runs on a computer and is the most common software on computers. Web browsers, e-mail programs, word processors, and databases are all example of computer applications.

As used herein, a file may be a collection of digital data stored in one unit, identified by a filename. The file can be a document, picture, audio or video stream, a data library, application, or another collection of data.

As used herein, a database may be a data structure that stores information and data that is organized to allow easy retrieval of the information. Typical databases contain multiple structures called tables, which may each include several different fields of data. For example, a company database may include tables for products, employees, and financial records. Each of the tables may have different fields that are relevant to the information stored in the table.

As used herein, a storage system may be a collection of computers, software applications, and storage devices that together operate to provide the persistence and retrieval of data from storage devices to and from computer applications and databases.

As used herein, a data block, a block of data, or simply a "block," is a sequence of bytes or bits, typically containing some whole number of records, that has a maximum length, e.g., a block size. The process of putting data into blocks is called blocking, while deblocking is the process of extracting data from blocks. Blocked data is normally stored in a data buffer and read or written a whole block at a time. Blocking can reduce the overhead in storage systems and can speed up the handling of a data-stream. Blocking is usually implemented when storing data to 9-track magnetic tape, to NAND flash memory, and to rotating media such as hard disks and optical disks. Most file systems are based on a block device, which provides a level of abstraction for the hardware responsible for storing and retrieving specified blocks of data, though the block size in file systems may be a multiple of the physical block size. Block storage is typically abstracted by the file system or database management system (DBMS) for use by computer applications and end users.

As used herein, a volume of data is a single accessible storage area with a single file system, typically, though not necessarily, residing on a single partition of a hard disk. In an embodiment, a volume of data can be different from a physical disk drive, however, the volume of data can be accessed with an operating system's logical interface. A volume of data is a logical representation of a number of data blocks, which data blocks are concatenated to form a larger set of data than can be stored as a group of data blocks. A volume of data is not the same as a partition in computer storage. For example, a floppy disk might be accessible as a volume, even though the floppy disk does not contain a partition, as floppy disks cannot be partitioned with most modern computer software. Furthermore, an operating system can recognize a partition without recognizing any volume associated with the partition, as when an operating system cannot interpret the filesystem stored there. Volumes of data exist at the logical operating system level while partitions exist at the physical, media specific level. Sometimes there is a one-to-one correspondence, but this is not a requirement. In Unix-like operating systems, volumes other than the boot volume have a mount-point somewhere within the filesystem, represented by a path. Logically, the directory tree stored on the volume is grafted in at the mountpoint. By convention, mount-points will often be placed in a directory called '/mnt', though '/media' and other terms are sometimes used. Files within a volume of data can generally be moved to any other place within that volume by manipulating the filesystem, without moving the actual data. However, if a file is to be moved outside the volume, the data itself must be relocated, which is a much more expensive operation.

Various techniques for storing a data volume in, for example, persistent memory, are disclosed. In an embodiment, a method for storing data blocks within a volume of data, involves creating a frame header to identify encoding and size of a data block, and storing the frame header and the data block in the volume of data. In an embodiment, the method involves creating an identifying sequence to identify if a data block is encoded or unencoded and storing the data block with the identifying sequence and with a frame header if the data block is encoded and storing the data block without the identifying sequence and without a frame header if the data block is encoded. In an embodiment, the method involves storing blocks of unencoded data and blocks of encoded data together within a single volume of data. In an embodiment, the method involves persisting unencoded data without adding additional encoding or framing overhead to a volume of data. In an embodiment, the method involves applying different encoding types to different data blocks within a single volume of data. In an embodiment, the method involves applying encoding to data blocks, that are stored in the volume but that were not previously encoded within the volume, whilst still allowing the storage system to continue to access the volume of data. In an embodiment, the method involves removing encoding from data blocks, that are stored in the volume and that were previously encoded, whilst still allowing the storage system to continue to access the volume of data. In an embodiment, the method involves generating an identifying sequence using at least one variable such that the identifying sequence is variable from one block of data to another. In an embodiment, the identifying sequence is generating using at least one of content of the data block, a data block or volume identifier, extracts of the structure of the frame header in the data block, output of various merge functions, and a storage system supplied input vector.

In an embodiment, another method for storing a data block in a volume of data in a persistent data storage system is disclosed. The method involves generating a header for a data block, the header including an indicator of the size of the data block and an indicator of the type of encoding, and storing the data block in the volume of data in the persistent data storage system with the header. The method may further involve determining if a data block is to be encoded before the data block is stored in a volume in a persistent data storage system, generating an identifying sequence related to the data block, and if the data block is to be encoded before the data block is stored in the volume of data in the persistent data storage system, storing the data block in the volume of data in the persistent data storage system with a header, the header including the identifying sequence, an indicator of the size of the data block, and an indicator of the type of encoding, and if the data block is not to be encoded before the data block is stored in the volume of data in the persistent data storage system, determining if there is a match between the identifying sequence and the data block, storing the data block in the volume of data in the persistent data storage system without a header if there is not a match between the identifying sequence and the data block, and storing the data block in the volume of data in the persistent data storage system with a header if there is a match between the identifying sequence and the data block, the header including the identifying sequence, an indicator of the size of the data block, and an indicator of the type of encoding.

In an embodiment, another method for storing a data block in a volume of data in a persistent data storage system is disclosed. The method involves generating headers for data blocks that are to be stored a volume of data, the headers including an indicator of the size of the respective data block and an indicator of the type of encoding for the respective data block, and storing multiple different data blocks in the volume of data in the persistent data storage system, the multiple different data blocks being stored with respective headers. The method may further involve determining if a data block is to be encoded before the data block is stored in a volume in a persistent data storage system, generating an identifying sequence related to the data block, and if the data block is to be encoded before the data block is stored in the volume of data in the persistent data storage system, storing the data block in the volume of data in the persistent data storage system with a header, the header including the identifying sequence, an indicator of the size of the data block, and an indicator of the type of encoding, and if the data block is not to be encoded before the data block is stored in the volume of data in the persistent data storage system, determining if there is a match between the identifying sequence and the data block, storing the data block in the volume of data in the persistent data storage system without a header if there is not a match between the identifying sequence and the data block, and storing the data block in the volume of data in the persistent data storage system with a header if there is a match between the identifying sequence and the data block, the header including the identifying sequence, an indicator of the size of the data block, and an indicator of the type of encoding.

In an embodiment, another method for storing a data block in a volume of data in a persistent data storage system is disclosed. The method involves, determining if a data block is to be encoded before the data block is stored in a volume in a persistent data storage system, generating an identifying sequence related to the data block, if the data block is to be encoded before the data block is stored in the volume of data in the persistent data storage system, storing the data block in the volume of data in the persistent data storage system with a header, the header including the identifying sequence, an indicator of the size of the data block, and an indicator of the type of encoding, and if the data block is not to be encoded before the data block is stored in the volume of data in the persistent data storage system, determining if there is a match between the identifying sequence and the data block, storing the data block in the volume of data in the persistent data storage system without a header if there is not a match between the identifying sequence and the data block, and storing the data block in the volume of data in the persistent data storage system with a header if there is a match between the identifying sequence and the data block, the header including the identifying sequence, an indicator of the size of the data block, and an indicator of the type of encoding. In an embodiment of the method, the identifying sequence is generated by including data from the data block as a variable in the generation of the identifying sequence such the identifying sequence would vary based on the content of the data block. In an embodiment of the method, the identifying sequence is generated by including an input vector supplied by the storage systems such that the identifying sequence is utilized to recognize the storage system instance or the storage system version that encoded the data block. In an embodiment, the method involves reading the data block from the volume of data in the persistent data storage system. Reading the data block involves reading the data block from the volume of data in the persistent data storage system, generating an identifying sequence from the block of data (for example, using the same technique) that is read from the volume of data in the persistent data storage system, determining if there is a match between the identifying sequence and the data block, use the data block as the data block was read from the volume of data if there is no match between the identifying sequence and the data block, determining if the data block is encoded from a header if there is a match between the identifying sequence and the data block.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or non-transitory computer-readable medium providing computer executable instructions, or program code, for use by or in connection with a computer or any instruction execution system. For the purposes of this description, a non-transitory computer-usable or computer readable medium can be any apparatus that can contain or store the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Figure 7:
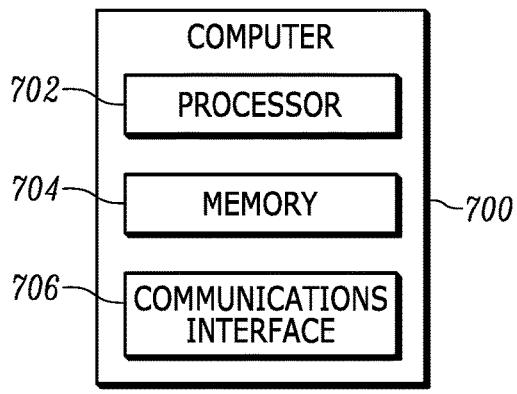
FIG. 7 depicts a computer that includes a processor, memory, and a communications interface.

In an embodiment, the above-described functionality is performed at least in part by a computer or computers, which executes computer readable instructions. FIG. 7 depicts a computer 700 that includes a processor 702, memory 704, and a communications interface 706. The processor may include a multifunction processor and/or an application-specific processor. Examples of processors include the PowerPC™ family of processors by IBM and the x86 family of processors by Intel such as the Xeon™ family of processors and the Intel X5650 processor. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a storage system to store data blocks of a file within a volume of data, the method comprising:
    for data blocks of a file that are to be encrypted;
        creating frame headers to identify an encryption type and a size of the data blocks of the file;
        generating identifying sequences to identify that the data blocks of the file are encrypted; and
        storing encrypted data blocks of the file in the volume of data with the frame headers and with the identifying sequences;
    the method further comprising:
    encrypting data blocks of the file that are currently stored in the volume but that were not previously encrypted within the volume and storing the encrypted blocks in the volume, while the storage system continues to store data blocks to the volume and to retrieve data blocks from the volume; and
    decrypting data blocks of the file that are currently stored in the volume as encrypted data blocks and storing the decrypted blocks in the volume, while the storage system continues to store data blocks to the volume and to retrieve data blocks from the volume;
    wherein the storage system treats the volume of data as a single atomic instance without maintaining an index of encoding of the data blocks stored within the volume.

2. The method as recited in claim 1 further comprising applying different encoding types to different data blocks of the file.

3. The method as recited in claim 1 wherein the data blocks are the smallest logical unit of storage.

4. The method as recited in claim 1 wherein the data blocks are 4 k bytes of data.

5. The method as recited in claim 1 wherein the data blocks are the unit of data that is persisted to a storage system in which the volume of data is stored.

6. The method as recited in claim 1 wherein data is persisted in units of whole data blocks and wherein a data block is the smallest logic unit of storage.

7. The method as recited in claim 1 further comprising for data blocks of the file that are not to be encoded;
    generating an identifying sequence; and
    storing unencoded data blocks of the file in the volume of data without the identifying sequence and without a frame header unless the identifying sequence matches existing data within the data blocks.

8. The method as recited in claim 1 further comprising, where an encryption key has been changed from a first encryption key to a second encryption key, maintaining some of the blocks of the file in the volume encrypted with the first key, encrypting some blocks of the file in the volume with the second encryption key such that the volume stores a mix of some blocks of data that are encrypted with the first encryption key and some blocks of data that are encrypted with the second encryption key.

9. A non-transitory computer-readable storage medium containing program instructions for operating a storage system to store data blocks of a file within a volume of data in a persistent data storage system, wherein execution of the program instructions by one or more processors of a computer system causes the one or more processors to perform steps comprising:
    for data blocks of a file that are to be encrypted;
        creating frame headers to identify an encryption type and a size of the data blocks of the file;
        generating identifying sequences to identify that the data blocks of the file are encrypted; and
        storing encrypted data blocks in the volume of data with the frame headers and the identifying sequences; and
    further comprising:
    encrypting data blocks of the file that are currently stored in the volume but that were not previously encrypted within the volume and storing the encrypted blocks in the volume, while the storage system continues to store data blocks to the volume and to retrieve data blocks from the volume; and
    decrypting data blocks of the file that are currently stored in the volume as encrypted data blocks and storing the decrypted blocks in the volume, while the storage system continues to store data blocks to the volume and to retrieve data blocks from the volume;
    wherein the storage system treats the volume of data as a single atomic instance without maintaining an index of encoding of the data blocks stored within the volume.

10. The non-transitory computer-readable storage medium of claim 9 containing program instructions for storing data blocks of a file within a volume of data in a persistent data storage system, wherein execution of the program instructions by one or more processors of a computer system causes the one or more processors to perform steps further comprising applying different encoding types to different data blocks of the file.

11. The non-transitory computer-readable storage medium of claim 9, wherein the data blocks are the smallest logical unit of storage.

12. The non-transitory computer-readable storage medium of claim 9, wherein the data blocks are 4 k bytes of data.

13. The non-transitory computer-readable storage medium of claim 9, wherein the data blocks are the unit of data that is persisted to a storage system in which the volume of data is stored.

14. The non-transitory computer-readable storage medium of claim 9, wherein data is persisted in units of whole data blocks and wherein a data block is the smallest logic unit of storage.

15. The non-transitory computer-readable storage medium of claim 9 containing program instructions for storing data blocks of a file within a volume of data in a persistent data storage system, wherein execution of the program instructions by one or more processors of a computer system causes the one or more processors to perform steps further comprising for data blocks of the file that are not to be encoded;
    generating an identifying sequence; and
    storing unencoded data blocks of the file in the volume of data without the identifying sequence and without a frame header unless the identifying sequence matches existing data within the data blocks.

16. The non-transitory computer-readable storage medium of claim 9, where an encryption key has been changed from a first encryption key to a second encryption key, maintaining some of the blocks of the file in the volume encrypted with the first key, encrypting some blocks of the file in the volume with the second encryption key such that the volume stores a mix of some blocks of data that are encrypted with the first encryption key and some blocks of data that are encrypted with the second encryption key.

17. A non-transitory computer-readable storage medium containing program instructions for storing data blocks of a file within a volume of data in a persistent data storage system, wherein execution of the program instructions by one or more processors of a computer system causes the one or more processors to perform steps comprising:
    for data blocks of a file that are to be encoded;
        creating frame headers to identify an encoding type and a size of the data blocks of the file;
        generating identifying sequences to identify that the data blocks of the file are encoded; and
        storing encoded data blocks in the volume of data with the frame headers and the identifying sequences,
    for data blocks of the file that are not to be encoded;
        generating an identifying sequence; and
        storing unencoded data blocks of the file in the volume of data without the identifying sequence and without a frame header unless the identifying sequence matches existing data within the data blocks.

\* \* \* \* \*